United States Patent [19]
Little et al.

[11] Patent Number: 5,430,568
[45] Date of Patent: Jul. 4, 1995

[54] OPTICAL COMMUNICATIONS SYSTEM FOR TRANSMITTING INFORMATION SIGNALS HAVING DIFFERENT WAVELENGTHS OVER A SAME OPTICAL FIBER

[75] Inventors: Frank R. Little, Alpharetta; Don E. Frymyer, Lilburn, both of Ga.

[73] Assignee: Scientific-Atlanta, Inc., Norcross, Ga.

[21] Appl. No.: 984,107

[22] Filed: Dec. 1, 1992

[51] Int. Cl.6 ........................ H04J 14/02; H04B 10/00
[52] U.S. Cl. .................................. 359/124; 319/161; 385/24
[58] Field of Search .......................... 359/124–125, 359/126–127, 133, 154, 161, 164, 173, 188, 195, 114–115; 385/24, 27; 328/163

[56] References Cited

U.S. PATENT DOCUMENTS

| | | | |
|---|---|---|---|
| 4,032,802 | 6/1977 | Pan | 307/311 |
| 4,045,675 | 8/1977 | Kingsley | 250/370 |
| 4,056,719 | 11/1977 | Waaben | 250/199 |
| 4,125,777 | 11/1978 | O'Brien | 250/551 |
| 4,282,604 | 8/1981 | Jefferson | 455/602 |
| 4,316,141 | 2/1982 | Adolfsson | 324/96 |
| 4,345,482 | 8/1982 | Adolfsson | 73/862 |
| 4,378,496 | 3/1983 | Brogardh | 250/227 |
| 4,600,847 | 7/1986 | Baum | 307/491 |
| 4,613,811 | 9/1986 | Vaerewyck | 324/96 |
| 4,709,154 | 11/1987 | Rademaker | 250/551 |
| 4,945,531 | 7/1990 | Suzuki | 359/133 |
| 4,969,710 | 11/1990 | Tick et al. | 385/141 |
| 5,035,481 | 7/1991 | Mollenauer | 359/188 |
| 5,063,559 | 11/1991 | Marcuse | 359/127 |
| 5,107,360 | 4/1992 | Huber | 359/124 |
| 5,191,459 | 3/1993 | Thompson et al. | 359/154 |
| 5,218,662 | 6/1993 | Dugan | 385/27 |
| 5,222,089 | 6/1993 | Huber | 372/26 |
| 5,224,183 | 6/1993 | Dugan | 359/124 |

OTHER PUBLICATIONS

"Predistortion Linearization of Directly Modulated DFB Lasers and External Modulators for AM Video Transmission" Childs, et al., OFC '90.

"Feasibility of Multi-Channel VSB/AM Transmission of Fiber Optic Links". J. Koscinski, *NCTA Technical Papers* (1987), p. 24.

"Linearization of Broadband Optical Transmission Systems by Adaptive Predistortion", M. Bertelsmeier, et al., *Frequenz* (1984) pp. 206–212.

"Linearization of Multichannel Analog optical Transmitters by Quasi-Feedforward Compensation Technique", Patterson, et al., *IEEE Transactions on Communications*, vol. Com 27, No. 3 (Mar. 1979 pp. 582–588.

"Phase-Shift Modulation Technique for the Linearization of Analogue Optical Transmitters", Strals, et al., *Electronics letters*, (Mar. 3, 1977, vol. 13 No. 5) pp. 149–151.

Primary Examiner—Leo H. Boudreau
Assistant Examiner—K. Negash
Attorney, Agent, or Firm—Banner, Birch, McKie & Beckett

[57] ABSTRACT

An optical communications system provides optical signals of different wavelengths over an optical fiber having a zero dispersion wavelength. Electrical dispersion compensating elements independently compensate optical signals having wavelengths different than the zero dispersion wavelength for dispersion in the optical fiber. Limiting radio frequency signals for modulating a light emitting device or laser outputting signals at a wavelength different than the zero dispersion wavelength to less than one octave of frequency permits second order harmonic distortion resulting from dispersion in the fiber to be filtered at a receiving location. The optical communications system may include a reverse transmission path.

24 Claims, 9 Drawing Sheets

OPTICAL COMMUNICATIONS SYSTEM FOR TRANSMITTING INFORMATION SIGNALS HAVING DIFFERENT WAVELENGTHS OVER A SAME OPTICAL FIBER

BACKGROUND OF THE INVENTION

1. Technical Field

The present invention generally relates to an optical communications system and, more particularly, to a fiber optic communications system for simultaneously transmitting information signals having different wavelengths over a same optical fiber.

2. Description of the Relevant Art

In recent years there has been a great deal of interest in the transmissions of various types of information television signals via optical fiber. Presently, most CATV systems for distributing television signals operate by modulating the video, audio, and other information for each television channel onto a respective radio frequency carrier signal. Each of these carrier signals typically has a bandwidth of 6 MHz. A plurality of these signals covering a broadband of radio frequencies (e.g., in the range of 54–550 MHz) are distributed via networks including 75 ohm coaxial cables and appropriate signal amplifiers and taps.

Optical fibers intrinsically have more information carrying capacity than do the coaxial cables which are used in present CATV systems. In addition, optical fibers are subject to less signal attenuation per unit length than are coaxial cables adapted for carrying radio frequency signals. Consequently, optical fibers are capable of spanning longer distances between signal regenerators or amplifiers than are coaxial cables. In addition, the dielectric nature of optical fiber eliminates the possibility of signal outages caused by electrical shorting or radio frequency pickup. Finally, optical fiber is immune to ambient electromagnetic interference ("EMI") and generates no EMI of its own.

A number of means are available for transmitting television signals and/or other types of information over optical fibers or other optical transmission media. For example, the 6 MHz baseband television signal may be converted to digital form. This digital information may be used to modulate a light signal which is transmitted via an optical link. Transmission of such a digitized 6 MHz video signal requires a digital data transmission rate of at least 45 megabits per second. High definition video ("HDTV") may require a digital data transmission rate of up to 145 megabits per second. Although emerging compression technologies may reduce these data rates, encoders and decoders for converting analog television signals to digital form and for reconverting these digital signals to analog form for viewing on a conventional television set are quite expensive. Consequently, analog transmission of television signals by optical means is, potentially, much more economical than digital transmission of such signals.

One such means of analog transmission is to use the baseband video signal to frequency modulate a radio frequency carrier. This modulated radio frequency carrier is in turn used to modulate an optical signal. Such frequency modulation is less susceptible to noise than is amplitude modulation, but it requires more bandwidth for each television channel than is required by amplitude modulation methods. Thus, the number of television channels which can be carried by each optical transmission link (e.g., each optical fiber) in an FM-based system may be somewhat limited. Moreover, since the standard NTSC fore, at for video calls for amplitude modulation of the video carder, means for converting FM signals to NTSC AM format are required either at the television set or at the point at which the fiber transmission trunk is connected to a coaxial distribution network. The need for such FM to NTSC AM conversion increases the cost of the system.

In view of the above, a system in which the video baseband signal amplitude modulates a radio frequency carrier signal which in turn amplitude modulates an optical signal is preferable to other systems from the standpoint of cost and simplicity. AM systems for long haul point-to-point delivery of high quality information television signals have been developed. As noted, such systems are more economical than digital or FM systems and have the benefit of maintaining the AM signal format throughout the system. Additionally, AM signal delivery is transparent to scrambling and compression techniques.

However, several phenomena limit the number of radio frequency channels which can be carded by present day optical links where the intensity of light signals is amplitude modulated. A first of these phenomena is a limitation of the amount of radio frequency energy which may be supplied as a modulating signal to a laser or other light generating device before various types of distortions are generated by the light generating device. This power limitation relates to the sum of the radio frequency power contributions of each radio frequency channel. Thus, if it is desired to transmit 80 radio frequency channels over a single optical link, each of these channels can be powered with only half of the power which would be available if only 40 channels were transmitted over the link. Such a limitation on the power of each radio frequency carrier brings each of these carried closer to the white noise level of the system, thus, adversely affecting the signal to noise ratio of the system. Decreasing the number of channels carried by each optical link in order to improve the signal to noise ratio increases the number of lasers and optical fibers which must be used, and thus the overall complexity and cost of the system. On the other hand, trying to increase the amount of radio frequency power supplied to the laser beyond certain limits causes the laser to produce several types of distortion, thereby degrading signal quality.

SUMMARY OF THE INVENTION

In accordance with the present invention, a system in which radio frequency signals amplitude modulate the intensity of light signals has been developed which requires fewer optical fibers to transmit the same number of channels as a conventional system. The inventive system retains the benefits of being more economical than a digital or an FM system and of maintaining the AM signal format.

In accordance with the invention, a plurality of light signals of different wavelengths may be transmitted over a single optical fiber. For example, at the transmitter location, a first group of radio frequency signals is used to amplitude modulate the intensity of the output of a first light emitting device outputting signals having a wavelength of 1310 nm. A second group of radio frequency signals is used to amplitude modulate the intensity of the output of a second light emitting device outputting signals having a wavelength of 1550 nm. The output signals of the first and second light emitting devices, which may be lasers, are supplied to an optical signal combiner such as a wavelength division multiplexer. The optical signal combiner combines the output signals of the light emitting devices for transmission over a single optical fiber. At the receiving location, the combined light signals are de-combined or demultiplexed and provided to receivers for convening the fight signals back to the original first and second groups of radio frequency signals. These groups of radio frequency signals may then be combined into a single broadband radio frequency signal. This exemplary system can reduce by up to a factor of two the number of fibers required to deliver the light signals.

The system of the present invention is designed to address problems associated with the transmission of optical signals of different wavelengths over a single optical fiber. For example, since an optical fiber generally transmits light signals with a minimum chromatic dispersion at a so-called zero dispersion wavelength, the quality of signals transmitted at wavelengths which differ from this zero dispersion wavelength is degraded. The units of chromatic dispersion are picoseconds of pulse spreading per kilometer of fiber per nanometer of source bandwidth. Present optical communications systems generally use fiber optimized for transmitting light signals having a wavelength of 1310 nm. in order minimize chromatic dispersion. However, the transmission of light signals at a wavelengths different than 1310 nm. is degraded. In accordance with one feature of the invention, degradation of optical signals may be reduced by limiting groups of radio frequency signals modulating light emitting devices which output light signals having wavelengths different than the zero dispersion wavelength for transmission over a given optical fiber to occupying less than one octave of frequency. That is, the highest signal frequency of the group is less than twice the lowest signal frequency of the group. Such a grouping permits a filter at the receiver location to be utilized to remove second order harmonic distortion due to chromatic dispersion.

In accordance with another feature of the invention, electrical and/or optical compensating elements are provided for independently compensating multiplexed signals transmitted over a same fiber. Such compensation may be selectively provided to compensate for distortion in the optical communications system caused, for example, by the electro-optic conversion process of the laser and/or by any amplifiers in the fiber link. The compensating elements may also be used to compensate for distortion due to dispersion which is not eliminated by the grouping of frequencies discussed above. The compensation may be implemented at the transmitter location, the receiver location, or at both the transmitter and receiver locations.

Also in accordance with the present invention, a reverse transmission path from the receiver location to the transmitter location can be provided over one of the optical fibers.

Accordingly, it is an object of the present invention to provide an AM optical communications system for transmitting information television signals which requires a reduced number of optical fibers.

It is another object of the present invention to provide an AM optical communications system for transmitting information television signals in which harmonic distortion due to dispersion may be minimized for signals transmitted in optical fibers at a wavelength which differs from the zero dispersion wavelength of the optical fiber.

It is still another object of the present invention to provide an AM optical communications system in which distortion of optical signals may be selectively compensated.

It is still another object of the present invention to provide an AM optical communications system for transmitting information television signals which has a reverse transmission path.

BRIEF DESCRIPTION OF THE DRAWINGS

These and other objects, features and advantages of the present invention will be better understood from a reading of the following detailed description in conjunction with the accompanying drawings in which.

DETAILED DESCRIPTION OF THE PREFERRED EMBODIMENTS

The present invention is described below in terms of a optical communications system for delivering optical signals corresponding to broadband radio frequency signals between CATV headend locations or from a CATV headend location to one or more remote locations situated within the area serviced by the headend. Such description is for the purposes of explanation only, and the invention is not limited in this respect.

Figure 1:
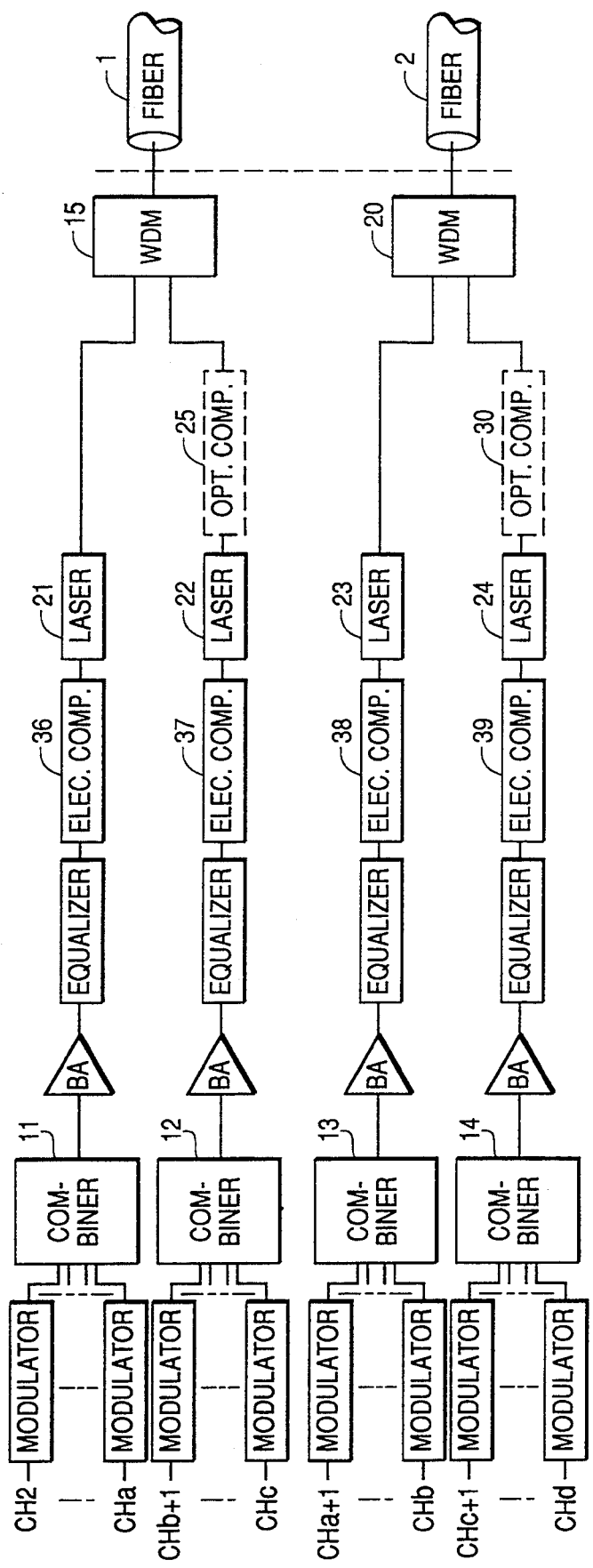
FIG. 1 is an illustrative transmission portion of a CATV headend configured in accordance with a first embodiment of the present invention.

Referring now to FIG. 1, there is shown an illustrative transmission portion of a CATV headend configured in accordance with a first embodiment of the present invention. At this headend, there exists a number of channels of information (channel 2 through channel d) to transmit to another headend or to a remote hub. In this illustrative example, the channels are television channels which occupy 6 MHz of bandwidth at baseband. It will be appreciated, however, that the present invention would be equally applicable for the transmission of any type of information through a network. Each of the baseband channels of information is supplied to a respective modulator of the type normally found at CATV headend installations (e.g. a Scientific Atlanta Model 6350). Each modulator serves to impose the baseband channels on a radio frequency carrier supplied by the modulator. Standard plug-in modulators are in common use at CATV headends which can produce modulated radio frequency signals in the range of, for example, 54–550 MHz and higher in 6 MHz increments. Thus, as shown in FIG. 1, a first group of baseband signals designated as channels 2 through a may be fed to a first group of modulators having carrier frequencies in, for example, the 54–174 MHz range. A second group of baseband signals designated a+1 through b may be fed respectively to a second group of modulators having carrier frequencies in, for example, the 174–276 MHz range. A third group of baseband signals designated b+1 through c may be fed respectively to a third group of modulators having carrier frequencies in, for example, the 276–402 MHz range. A fourth group of baseband signals designated c+1 through d may be ted respectively to a fourth group of modulators having carrier frequencies in, for example, the 402–552 MHZ range.

In the illustrative example set forth above, four groups of baseband signals are designated. It will be appreciated that the invention is equally applicable to systems in which various numbers of groups are defined. In the embodiment of FIG. 1, each of the four groups of baseband signals are combined into broadband signals in the respective frequency ranges by respective radio frequency signal combiners 11–14. Each of the broadband radio frequency signals output from combiners 11–14 may be passed through respective buffer amplifiers BA and equalizers in order to provide equivalent signals for amplitude modulating the light output of respective lasers 21–24. Details of transmitter circuitry suitable for use in the system of FIG. 1 may be found in commonly assigned application Ser. No. 07/754,029 now U.S. Pat. No. 5,267,071, filed Sep. 3, 1991.

Lasers 21 and 22 constitute a first laser pair emitting optical signals of different wavelengths which are optically combined or multiplexed by wavelength division multiplexer 15 for transmission over single mode 1310 nm. zero dispersion optical fiber 1. Lasers 23 and 24 constitute a second laser pair emitting optical signals of different wavelengths which are multiplexed by wavelength division multiplexer 20 for transmission over single mode 1310 nm. zero dispersion optical fiber 2. Wavelength division multiplexers 15 and 20 are preferably of the coupled-fiber type, although the invention is not limited in this respect. In a currently preferred implementation, laser 21 outputs optical signals at 1310 nm., laser 22 outputs optical signals at 1550 nm., laser 23 outputs optical signals at 1310 nm., and laser 24 outputs optical signals at 1550 nm. Lasers 21–24 are preferably distributed-feedback type lasers. A 1310 nm. back-up laser (not shown) and a 1550 nm. back-up laser (not shown) may be provided to respectively back up one or both of the 1310 nm. and 1550 nm. lasers as described in commonly assigned U.S. application Ser. No. 07/753,952 now U.S. Pat. No. 5,241,610 entitled "Optical Switching in a Fiber Communications System", filed Sep. 3, 1991. It is noted that while the system of FIG. 1 illustrates two optical signals of different wavelengths multiplexed over a single optical fiber, the invention may be readily applied to systems multiplexing more than two optical signals of different wavelengths onto a single optical fiber.

A preferred number of channels in each of the frequency ranges, the wavelength of the optical signals corresponding to the radio frequency bandwidth, and laser power for the lasers of the system of the first embodiment are set forth in Table 1.

TABLE 1

| Bandwidth | # of Channels | Wavelength | Power |
|---|---|---|---|
| 54–174 | 14–16 | 1310 nm. | 6 or 8 mW |
| 174–276 | 17 | 1310 nm. | 6 or 8 mW |
| 276–402 | 21 | 1550 nm. | 4 or 6 mW |
| 402–552 | 25 | 1550 nm. | 4 or 6 mW |

These numbers are illustrative only and the invention is not limited in this respect.

In accordance with the embodiment of Table 1, the frequency bands of the radio frequency signals which are combined and supplied to 1550 nm. lasers 22 and 24 and to 1310 nm. laser 23 each cover less than one octave. That is, the highest signal frequency in the frequency band is less than twice the lowest signal frequency in the frequency band. This arrangement is advantageous since any second order harmonic distortion, such as harmonic distortion due to chromatic dispersion for the 1550 nm. optical signals, is outside the frequency range of the band and thus may be filtered at the receiver location.

Since optical fibers 1 and 2 are 1310 nm. zero dispersion wavelength optical fibers, the 1310 nm. optical signals are transmitted with minimum chromatic dispersion, while the 1550 nm. optical signals are transmitted in the same fiber with increased chromatic dispersion, but with minimum optical loss. In addition, both the 1310 nm. and 1550 nm. signals are subject to other types of distortion. One of the primary sources of such distortion is the electrical to optical transducer, a laser in the present system. Optical amplifiers in the optical link may also generate distortion.

Figure 2:
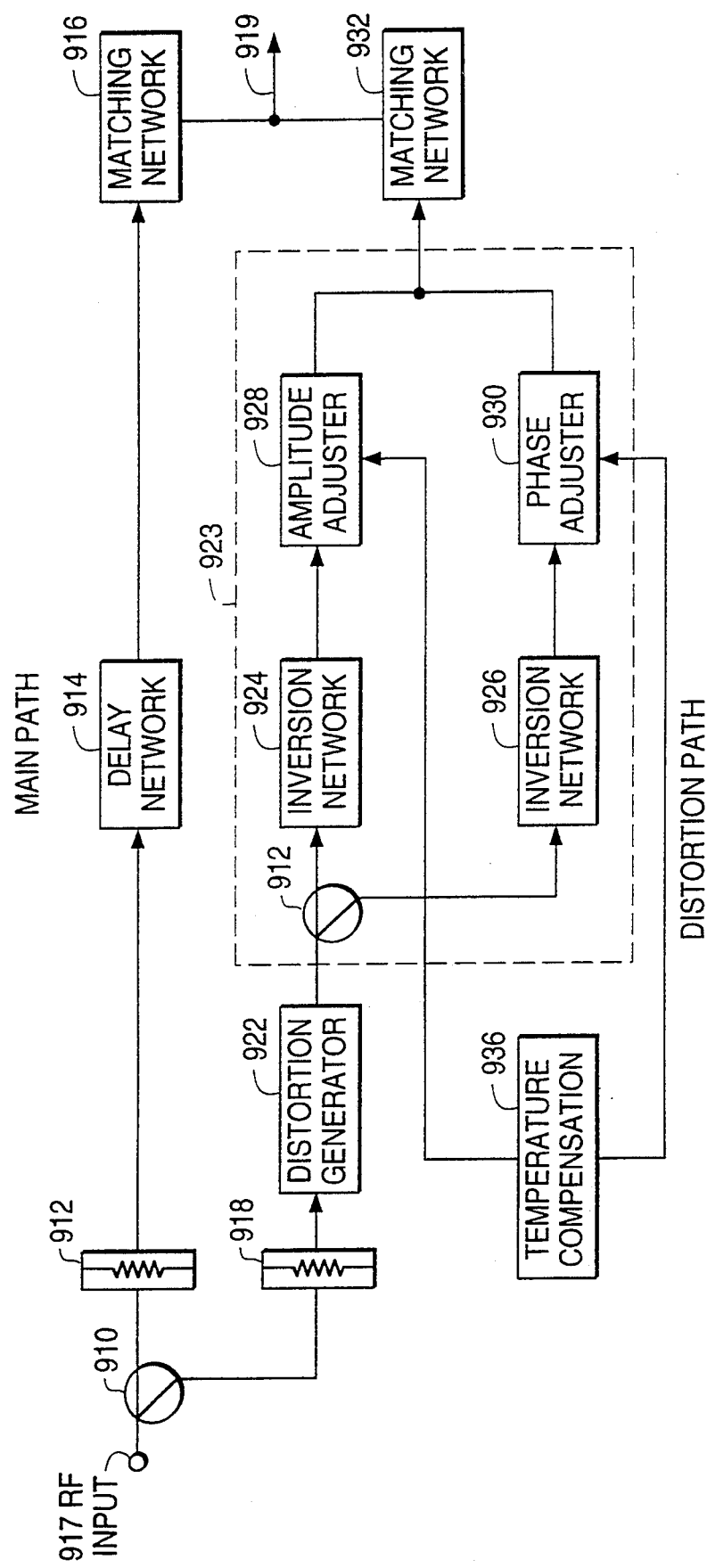
FIG. 2 is a functional block diagram of one type of electrical compensating element for use in the CATV headend of FIG. 1.

In order to compensate such distortion, the CATV headend of the present invention incorporates electrical compensating elements 36–39 for independently compensating the optical signals for harmonic distortion. FIG. 2 is a functional block diagram of one type of electrical compensating element. The element is connected to the output of the corresponding equalizing circuit at terminal 917 and feeds the corresponding laser at terminal 919. The element illustrated by this diagram is particularly suited for dispersion compensation. The radio frequency modulating signal is split into two paths by a directional coupler 910 with most of the power of the signal being transmitted through a main path and a much smaller portion being transmitted through a distortion path. The main path includes a plug-in resistive pad 912, a delay network 914, and a matching network 916. The resistive pad sets the level of the radio frequency modulating signal in the main path for a desired modulation index for the laser diode. The delay network 914, which can be a predetermined length of coaxial cable, is used for delaying the main path signal by substantially the same amount of time as the transit of the RF modulation signal through the distortion path. The matching network 916 matches the output impedance of the delay network 914 to the low input impedance of the laser.

The distortion path includes a plug-in resistive pad 918, a distortion generator 920, distortion signal adjustment networks 923, and a matching network 932. The pad 918 sets the level of the sample of modulation signal such that the distortion path will provide a distortion signal of substantially the same amplitude as the distortion experienced by the optical signal. The distortion generator 920 then distorts the sample of the input modulation signal in a similar manner as the optical transmission system distorts the optical signal in the fiber system. Distortion generator 920 may, for example, generate second order distortion or third order distortion. Independent adjustments to the phase and amplitude of the distortion signal are made with the adjustment networks 923 and the signal is input to the matching network 932. Matching network 932 matches the output impedance of the networks 923 to the low input impedance of the laser.

To produce a distortion signal having the same phase and amplitude but opposite in sense (180 degrees out-of-phase) so as to cancel the distortion caused by the optical transmission system, adjustments are made by the distortion signal adjustment networks 923. Networks 923 include two legs, specifically, an in-phase leg and a quadrature leg. The separate legs are fed from a directional coupler 922 which splits the distortion signal generated from the distortion generator 920. One portion of the distortion signal passes through the in-phase leg which includes an inversion network 924 and an amplitude adjustment network 928. Another portion of the distortion signal passes through the quadrature leg which includes an inversion network 926 and a phase adjustment network 930.

The inversion network 924 provides the correct sense for the distortion signal such that it will cancel the distortion generated in the transmission system. The amplitude of the distortion signal is then adjusted as a function of frequency. The quadrature leg is independent of this adjustment and produces a phase adjustment signal whose overall amplitude can be varied by the phase adjustment network 930. The phase adjustment signal is combined with the amplitude adjusted signal from network 928 to produce a phase and amplitude adjusted distortion signal for input to the matching network 932. The inversion network 926 permits the correct sense of the distortion signal to be chosen so that the phase adjustment can be leading or lagging.

The adjustment networks 928 and 930 contain elements whose gains vary as a function of temperature. To maintain a predetermined gain from these elements, a temperature compensation circuit 936 is provided. The temperature compensation circuit 936 measures the ambient temperature with a temperature responsive sensor and adjusts the bias current and operating point of the temperature sensitive devices accordingly.

Figure 3:
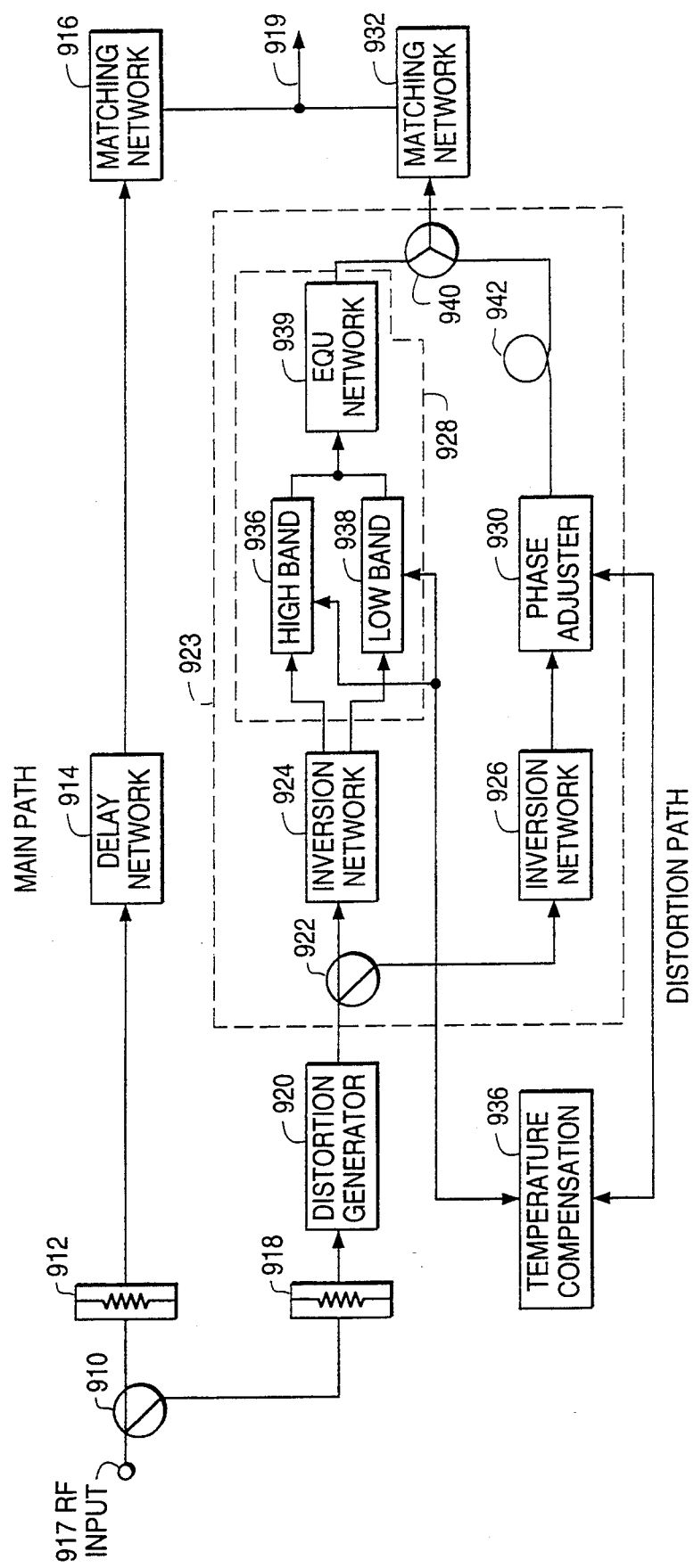
FIG. 3 is a functional block diagram of another type of electrical compensating element for use in the CATV headend of FIG. 1.

FIG. 3 is a functional block diagram of another type of electrical compensating element which may be utilized in the system of the present invention. The compensating element of FIG. 3 is particularly suited for distortion compensation due to electro-optic conversion and/or optical amplifiers. In this embodiment, elements which perform similar functions to that of the electrical compensating element of FIG. 2 are referenced with like numerals. The electrical compensating element of FIG. 3 differs from the element of FIG. 2 mainly in the configuration of the distortion signal adjustment networks 923. Particularly, the amplitude adjustment network 928 includes a diplex filter arrangement where an amplitude adjustment as a function of frequency is made with a high band filter 936 and with a low band filter 938. The inversion network 924 which feeds the high and low band filter networks 936, 938 has a dual output and is therefore different in structure, but similar in function to the inversion network 924 of FIG. 2. The amplitude adjustment network 928 also includes an equalization network 939 which smoothly combines the outputs from the high band filter 936 and low band filter 938. The quadrature leg in the distortion signal adjustment networks 923 contains an inversion network 926 and a phase adjustment network 930 similar in function to those elements found in FIG. 2. The outputs of the amplitude adjustment network 928 and phase adjustment network 930 are combined in a directional combiner 940 before being input to matching network 932. A delay network 942, formed, for example, by a length of coaxial cable, equalizes the delay that is seen in the quadrature leg to that of the in-phase leg because of the equalization network 939.

Preferred, but nonetheless illustrative, circuits suitable for utilization as the elements of FIGS. 2 and 3 may be found in commonly assigned, copending application Ser. No. 805,251 entitled "Method and Apparatus for Predistortion" and application Ser. No. 805,259 entitled "Method and Apparatus for Predistortion."

A preferred electrical compensating element for use in the system of the present invention includes a distortion generator for generating both second and third order distortion products. Such an element will be described with reference to FIG. 4. The compensation element of FIG. 4 includes a distortion generator 820 for generating second and third order distortion. The distortion path includes a first distortion path for the second order distortion components and a second distortion path for the third order distortion components. The respective outputs of the adjusting networks in each of these paths is combined by directional coupler 850. The compensation signal from directional coupler 850 is combined with the RF input signal with distortion at directional coupler 816. Preferred, but nonetheless illustrative, circuits suitable for utilization as the elements of FIG. 4 may be found in commonly assigned, copending application Ser. No. 07/958,976 entitled "Post-distortion Circuit For Reducing Distortion In An Optical Communications System", filed Oct. 9, 1992.

It has been discussed above that the radio frequency bands feeding the 1550 nm. lasers 22 and 24 be limited to less than an octave. It is also noted that the 174–276 MHz band of radio frequencies supplied to 1310 nm. laser 23 is also limited to less than one octave. The second order harmonic distortion for each of these bands may then be eliminated by filtering at the receiver location. Thus, compensating elements 37, 38 and 39 for compensating these signals need, in general, to only compensate for third order distortion products and a compensating element such in FIG. 2 or 3 may be utilized with a distortion generator for generating third order distortion. However, the 54–174 MHz radio frequency band is wider than one octave. Accordingly, electrical compensating element 36 arranged between the output of combiner 11 and laser 21 preferably compensates the optical signal corresponding to this frequency band for second order and third order distortion products and a compensating element such as in FIG. 4 may be utilized. In view of certain manufacturing efficiencies associated with incorporating a single type of compensating element in the system, each of the compensating elements 36–39 may be of the type illustrated in FIG. 4.

Thus, in accordance with the invention, "predistortion" compensation at the transmitter location is provided to compensate the non-linearities of the laser. If an optical amplifier(s) is present in the optical link, predistortion compensation may be provided to compensate for the non-linearities of the laser and the optical amplifier(s). In a system with a multiplicity of receiving locations, some amount of independent precompensation for chromatic dispersion, particularly for the 1550 nm. signals, may be provided for a common length of optical fiber between the transmitters and receivers. Such precompensation may be accomplished with appropriate adjustments to the electrical compensating circuitry described above or by the inclusion of optical compensating elements 25 and 30. Optical compensating elements 25 and 30 are indicated by dotted line boxes to indicate they are optionally included in the system. Optical compensating elements 25 and 30 may, for example, be optical fibers having dispersion profiles opposite to the dispersion profile experienced by the optical signals output from lasers 22 and 24 when transmitted over standard optical fibers 1 and 2 to the receiving location. Optical compensating fibers suitable for compensating a specific profile may be developed by first determining the dispersion profile experienced by the optical signal to be compensated during transmission. In general, such profiles represent second and third order harmonic distortion, known in the art as composite second order and composite triple beat, respectively. By varying fiber parameters such as material, doping, and the division of light between the core and the cladding, a fiber having a dispersion profile opposite the determined profile is developed.

Thus, an electrical compensating element and/or an optical compensating element in the present system provides the capability of independently "precompensating" an optical signal for harmonic distortion in the fiber communications system due to chromatic dispersion, the electro-optic conversion process, and or amplifiers in the optical link. One advantage of precompensation at the transmitter location is that a single electrical and/or a single optical precompensating element may be utilized, for example, to compensate an optical signal for transmission to a plurality of re,note hubs.

The teachings of the invention may be readily adapted for use in an optical communications system utilizing dispersion-shifted single mode 1550 nm. fibers. In dispersion-shifted fiber, the zero dispersion wavelength has been shifted to 1550 nm. 1550 nm. optical signals may be transmitted in such fiber with zero dispersion and minimum loss. However, 1310 ran. optical signals transmitted in such fibers are subject to chromatic dispersion. Again both 1310 nm. and 1550 nm. optical signals are subject to distortion due to the electro-optic conversion process and/or amplifiers.

Figure 5:
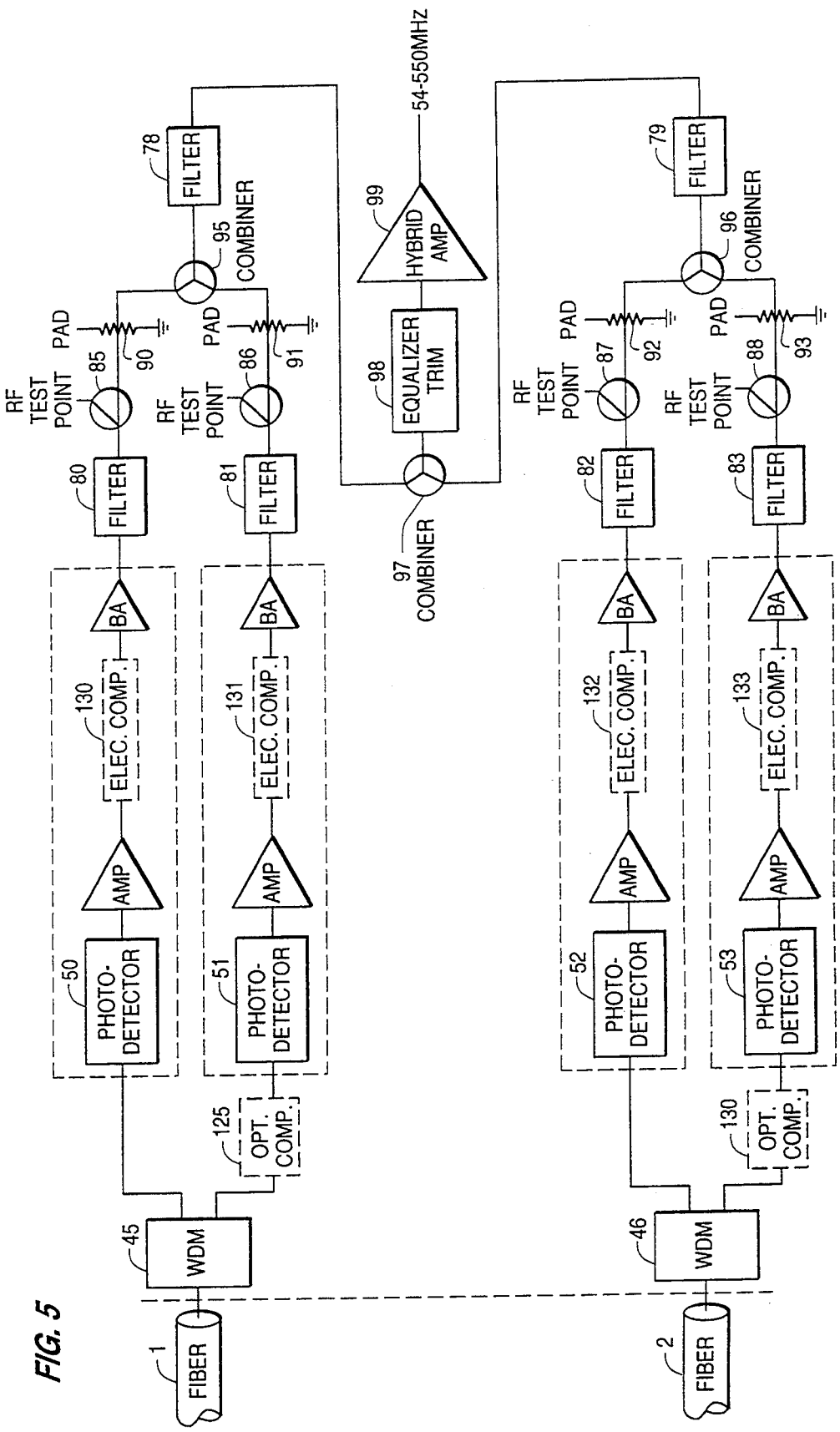
FIG. 5 is an illustrative receiver portion of a CATV headend or remote hub configured in accordance with the first embodiment of the present invention.

Referring now to FIG. 5, there is shown an illustrative receiver portion of a CATV headend or a remote hub configured in accordance with the first embodiment of the present invention. Optical fibers 1 and 2 deliver the combined or multiplexed 1310 nm. and 1550 nm. optical signals output by the transmitter portion of FIG. 1. The optical signals from optical fibers 1 and 2 are respectively supplied to optical decombiners or wavelength division multiplexers 45 and 46. Wavelength division multiplexer 45 demultiplexes the multiplexed optical signals carded by optical fiber 1 into the 1510 nm. optical signal from laser 22 for feeding to photodetector 51 and the 1310 nm. signal from laser 21 for feeding to photodetector 50. Wavelength division multiplexer 46 demultiplexes the multiplexed optical signals carried by optical fiber 2 into the 1510 nm. optical signal frown laser 24 for feeding to photodetector 53 and the 1310 nm. optical signal from laser 23 for feeding to photodetector 52.

The demultiplexed optical signals are supplied to the respective photodetectors. The photodetectors, such as PIN photodiodes, transduce the intensity modulated optical signal supplied to their inputs into amplitude modulated electric current signals. The outputs of photodetectors are amplified by photodetector amplifiers, which may be a push-pull transimpedance amplifier or other suitable type designed for CATV applications. The radio frequency output of the photodetector amplifiers are amplified by buffer amplifiers for output to one of the filters 80, 81, 82, and 83. Taken together, the photodetector, the photodetector amplifier and, the buffer amplifier constitute an optical receiver. Details of an optical receiver suitable for use in the present system may be found in commonly assigned U.S. application Ser. No. 07/754,029, filed Sep. 3, 1991. In addition, a back-up optical receiver (not shown) for backing up one or more of receivers 70-73 may be provided as described in commonly assigned U.S. application Ser. No. 07/753,952 entitled "Optical Switching in a Fiber Communications System", filed Sep. 3, 1991.

The outputs of the buffer amplifiers are respectively supplied to filters 80-83 which may be multiple pole elliptical bandpass filters. These filters are designed to attenuate frequencies outside of the frequency band of interest on a particular signal path and also act to remove broadband noise from combining between bands. Each of the filters 80-83 is connected to a respective radio frequency test point 85-88. The radio frequency test points are directional couplers for coupling off a portion of the signal output by the corresponding filter. The radio frequency test points are in turn respectively coupled to pads 90-93, which are of conventional design. Pads 90 and 91 are connected to a combiner 95 and pads 92 and 93 are connected to a combiner 96. Pads 90-93 are pluggable units which are selected to equalize the amplitude of the signals fed to combiners 95 and 96. The attenuation required of each pad may be determined by monitoring the outputs of filters 80-83 via radio frequency test points 85-88. The respective outputs of combiners 95 and 96 are provided to filters 78 and 79 which are connected to a combiner 97. The output of combiner 97 is connected to an equalizer trim circuit 98 which in turn feeds a hybrid amplifier 99 such as a Scientific-Atlanta Model 6451 HE/driver amplifier. The output of hybrid amplifier 99 is a broadband radio frequency signal corresponding to the radio frequency inputs supplied to the transmitter portion illustrated in FIG. 1.

It is noted that if bandpass filters are used at the receiver it may be desirable to combine the outputs of filters 80-83 such that a single band is produced. For example, combining the output of filter 80 with the output of filter 82 would yield a single band from 54-276 MHz.

The purpose of equalizer trim circuit 98 is to flatten out the signal output of combiner 97. In this regard, two types of adjustments may be required to the signal. Firstly, the signal from the combiner may be "tilted." That is, there may be differences between the amplitudes of the higher frequency signals and lower frequency signals which vary across the frequency band in a linear manner. Secondly, at certain points in the frequency band and, especially at the interfaces between the sub-bands carried by the various optical links, there may be notches in the response wherein some channels or groups of channels have a higher or lower amplitude than the channels surrounding them. It is desirable to smooth out these notches or peaks in the frequency response.

Although a currently preferred implementation of the first embodiment utilizes electrical and/or optical compensating elements at the transmitter location only, it is contemplated that electrical and/or optical compensating elements for the independent compensation of optical signals at the receiver location may be provided in addition to, or in place of, compensating elements at the transmitter location. To implement such "post-compensation," electrical compensating elements 130–133 may be arranged between the photodetector amplifiers and the buffer amplifiers in the optical receivers. Alternatively, the compensating elements may be arranged after the buffer amplifiers. Electrical compensating elements 130–133 may be circuits for generating signals which are adjusted in amplitude and phase to cancel the distortion generated in the transmission of the respective optical signals.

Figure 6:
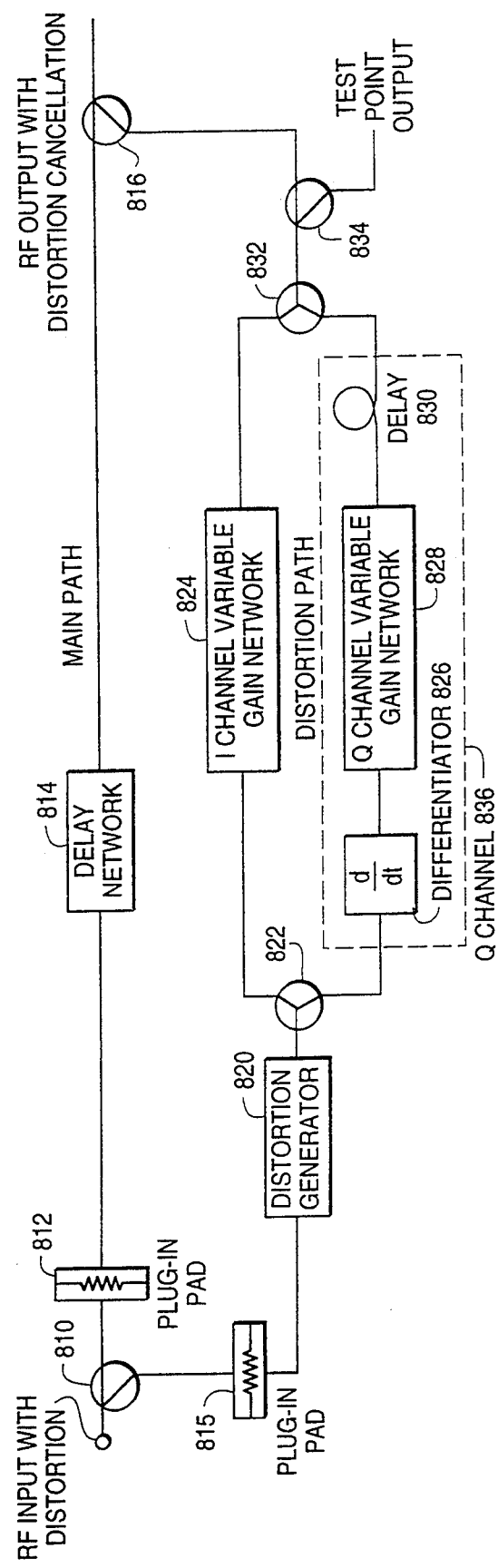
FIG. 6 is a functional block diagram of an electrical compensating element suitable for use in the receiver of FIG. 5.

FIG. 6 is a schematic block diagram of an electrical compensating element suitable for use at the receiver location. The radio frequency input to the electrical compensating element is the output from the photodetector amplifiers of FIG. 5. The radio frequency signal with distortion is split into two paths by directional coupler 810 with most of the output connected to a plug-in pad 812 in a first main path, and a smaller amount connected to a plug-in pad 815 in a second compensation path. The main path includes plug-in pad 812 and delay network 814. Delay network 814, which may be a coaxial transmission line, distributed delay line, or other suitable delay network, provides a main path signal delay which is substantially equal to the time for a signal to pass through the -post-distortion path.

The distortion path includes a plug-in pad 815, a distortion generator 820, directional couplers 822,832, and 834, and a distortion signal adjustment network 823. Plug-in pad 815 is used to set the signal level to distortion generator 820 to optimize the output of the distortion generator with respect to the amplitude of the desired distortion, suppression of higher order distortion, and suppression of the broadband radio frequency signal. The broadband radio frequency signal with distortion passes from plug-in pad 815 to distortion generator 820. The purpose of distortion generator 820 is to generate intermodulation distortion, primarily second order or third order while substantially suppressing the broadband radio frequency signal. The output of distortion generator 820 is provided to adjustment network 823 for adjusting the phase and amplitude of the distortion signal. Specifically, the output of distortion generator 820 is split by directional coupler 822 into two paths: an in-phase path which will be referred to as the I channel, and a 90-degree shifted quadrature path which will be referred to as the Q channel. The I channel includes an I channel variable gain network 824 and the Q channel includes differentiator 826, Q channel variable gain network 828, and delay 830. The gain and phase of the signals in the I and Q channels are adjusted to appropriately compensate the received radio frequency signal for distortion. The outputs of the I and Q channels are combined into a compensation signal by directional coupler 832. Directional coupler 834 provides an output from the compensation path for testing purposes. The compensation signal from directional coupler 832 is combined with the radio frequency input signal with distortion in the main signal path by directional coupler 816. With appropriate adjustments to the gain and phase in the I and Q channels, the combination of the radio frequency input signal with distortion and the compensation signal cancels or substantially suppresses the distortion in the radio frequency input signal. It is noted that resistive matching may also be used to combine the paths.

Preferred, but nonetheless illustrative, circuits suitable for utilization as the elements of FIG. 6, as well as circuitry for providing compensation for both second and third order distortion, may be found in commonly assigned, copending application Ser. No. 07/958,976 entitled "Post-distortion Circuit For Reducing Distortion In An Optical Communications System", filed Oct. 9, 1992.

Thus, optical signals may be independently "post-compensated" by the provision of electrical compensating elements in the receiver apparatus of FIG. 5. As discussed above, in the preferred embodiment, the radio frequency bands corresponding to the 1550 nm. and one of the 1310 nm. optical signals are arranged such that the second order distortion may be filtered by filters 81–83. Thus, electrical compensating elements 13 1–133 may be utilized to compensate the corresponding signals for third order distortion products. Compensating element 130 may be used to provide compensation for both second and third order distortion products.

It is noted that since the magnitude of dispersion is dependent on fiber length, postcompensation is particularly advantageous at remote hubs which are linked to a single CATV headend by optical links of different lengths. In such systems, postcompensation permits compensation for specific dispersion profiles and/or electro-optic conversion distortion experienced by optical signals transmitted to the respective remote hubs. Thus, in accordance with the invention, postdistortion compensation at the receiver location may provided in place of or to supplement the precompensation at the transmitter. To compensate for dispersion, particularly for the 1550 nm. signals, optical compensating elements 125 and 130 may be provided. Optical compensating elements 125 and 130 may, for example, be optical fibers having dispersion profiles opposite to the dispersion profile experienced by the optical signals output from lasers 2 and 4 when transmitted over standard single mode 1310 nm. optical fibers 1 and 2 to the receiving location. By varying fiber parameters such as material, doping, and the division of light between the core and the cladding, a fiber having a dispersion profile opposite the determined profile is developed.

It will be appreciated that in the overall optical communications system described by FIGS. 1–6, the various techniques for compensating and/or filtering distortion components due to dispersion and/or the electro-optic conversion may be utilized as dictated by the needs or requirements of a particular system. The teachings of the first embodiment illustrate how these techniques may be effectively utilized in an AM fiber system for transmission of information television signals. The AM transmission of such systems requires no signal conversion, thereby reducing the number of system components. Significantly, the system of the present invention achieves signal delivery using fewer optical fibers than conventional AM systems by using wavelength division multiplexers, whereby at least two signals, rather than one, can be sent through each fiber. By implementing the dispersion and distortion compensation techniques disclosed herein, optical signals transmitted at wavelengths different than the zero dispersion wavelength of the optical fiber are not degraded. These techniques make the implementation of long haul multiplexed AM fiber communications systems practical. Exemplary, but illustrative, specifications of a system in accordance with the first embodiment of the present invention are:

|  | Estimated Loss Budget (dB) | | CNR |
|---|---|---|---|
|  | 1310 nm. | 1550 nm. | 550 MHz |
| Distance (km) | | | |
| 20 | 9 | 7 | 56.5 |
| 30 | 12.75 | 9.75 | 54 |
| 40 | 16.5 | 12.50 | 51.5 |
| 50 | 20.25 | 15.25 | 48 |
| Distortions | | | |
| CTB | | | 70 |
| CSO | | | 70 |

Figure 7:
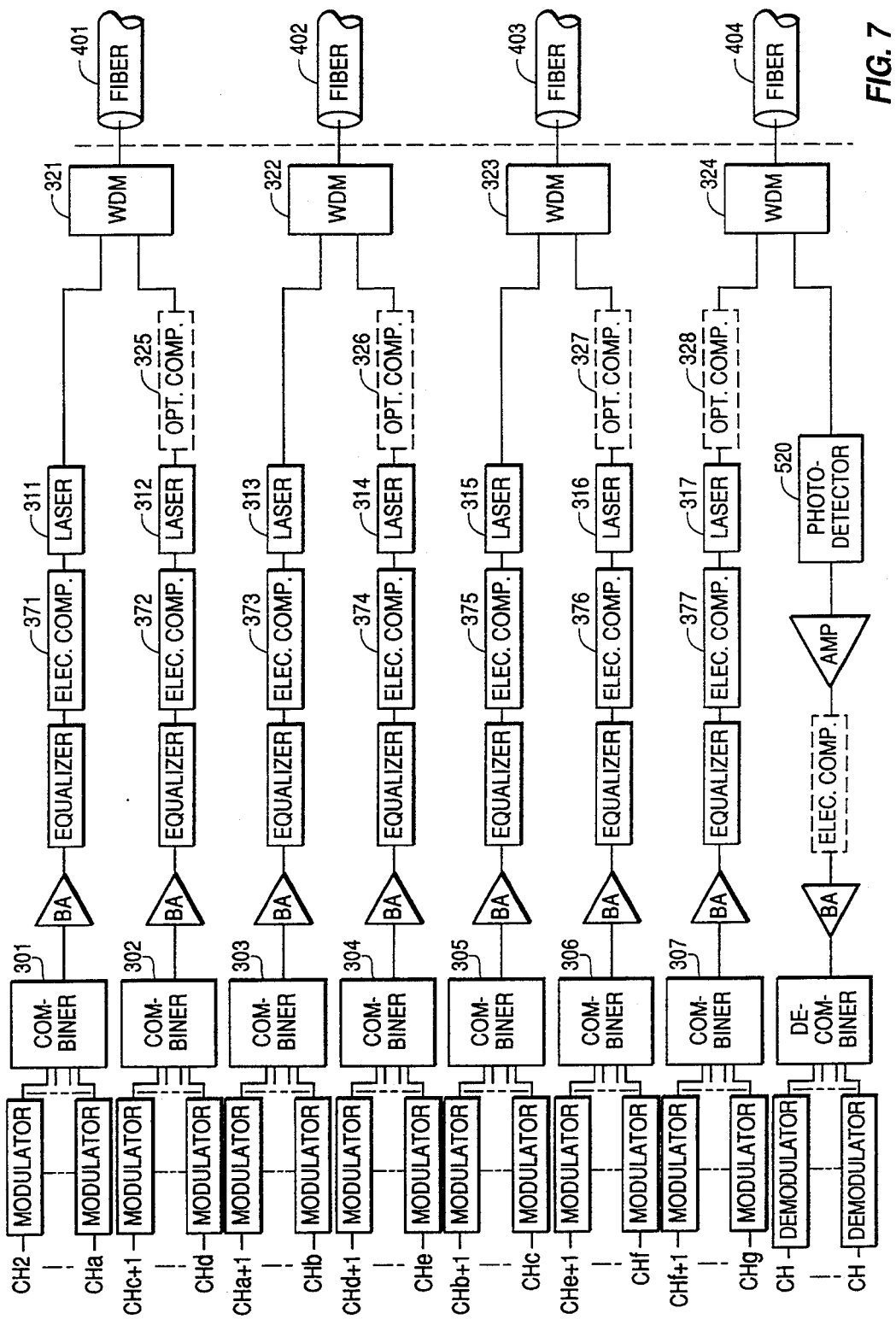
FIG. 7 is an illustrative transmission portion of a CATV headend configured in accordance with a second embodiment of the present invention.

Referring now to FIG. 7, there is shown an illustrative transmission portion of a CATV headend configured in accordance with a second embodiment of the present invention. The second embodiment is similar to the CATV illustrated in FIG. 1, but includes lasers for transmitting additional bands of radio frequency signals and also includes a reverse transmission path. At the CATV headend of FIG. 7, there exists a number of channels of information (channel 2 through channel g) to transmit to another headend or to one or more remote hubs. The channels are television channels which occupy 6 MHz of bandwidth at baseband. Each of the baseband channels of information is supplied to a respective modulator and each modulator serves to impose the baseband channels on a radio frequency carder supplied by the modulator. As shown in FIG. 7, a first group of baseband signals designated as channels 2 through a may be fed to a first group of modulators having carrier frequencies in, for example, the 54–150 MHz range. A second group of baseband signals designated a+1 through b may be fed respectively to a second group of modulators having carder frequencies in, for example, the 150–222 MHz range. A third group of baseband signals designated b+1 through c may be fed respectively to a third group of modulators having carrier frequencies in, for example, the 222–276 MHz range. A fourth group of baseband signals designated c+1 through d may be fed respectively to a fourth group of modulators having carrier frequencies in, for example, the 276–330 MHZ range. A fifth group of baseband signals d+1 through e may be fed respectively to a fifth group of modulators having carder frequencies in, for example, the 330–402 MHz range. A sixth group of baseband signals designated e+1 through f may be fed respectively to a sixth group of modulators having carrier frequencies in, for example, the 402–474 MHz range. Finally, a seventh group of baseband signals designated f+1 through g may be fed respectively to a seventh group of modulators having carder frequencies in, for example, the 474–552 MHz range.

In the embodiment of FIG. 7, each of the seven groups of baseband signals are combined into broadband signals in the respective frequency ranges by respective radio frequency signal combiners 301–307. Each of the broadband radio frequency signals output from combiners 300–307 may be passed through respective buffer amplifiers BA and equalizers in order to provide equivalent signals for amplitude modulating the light output of respective lasers 311–317.

Figure 4:
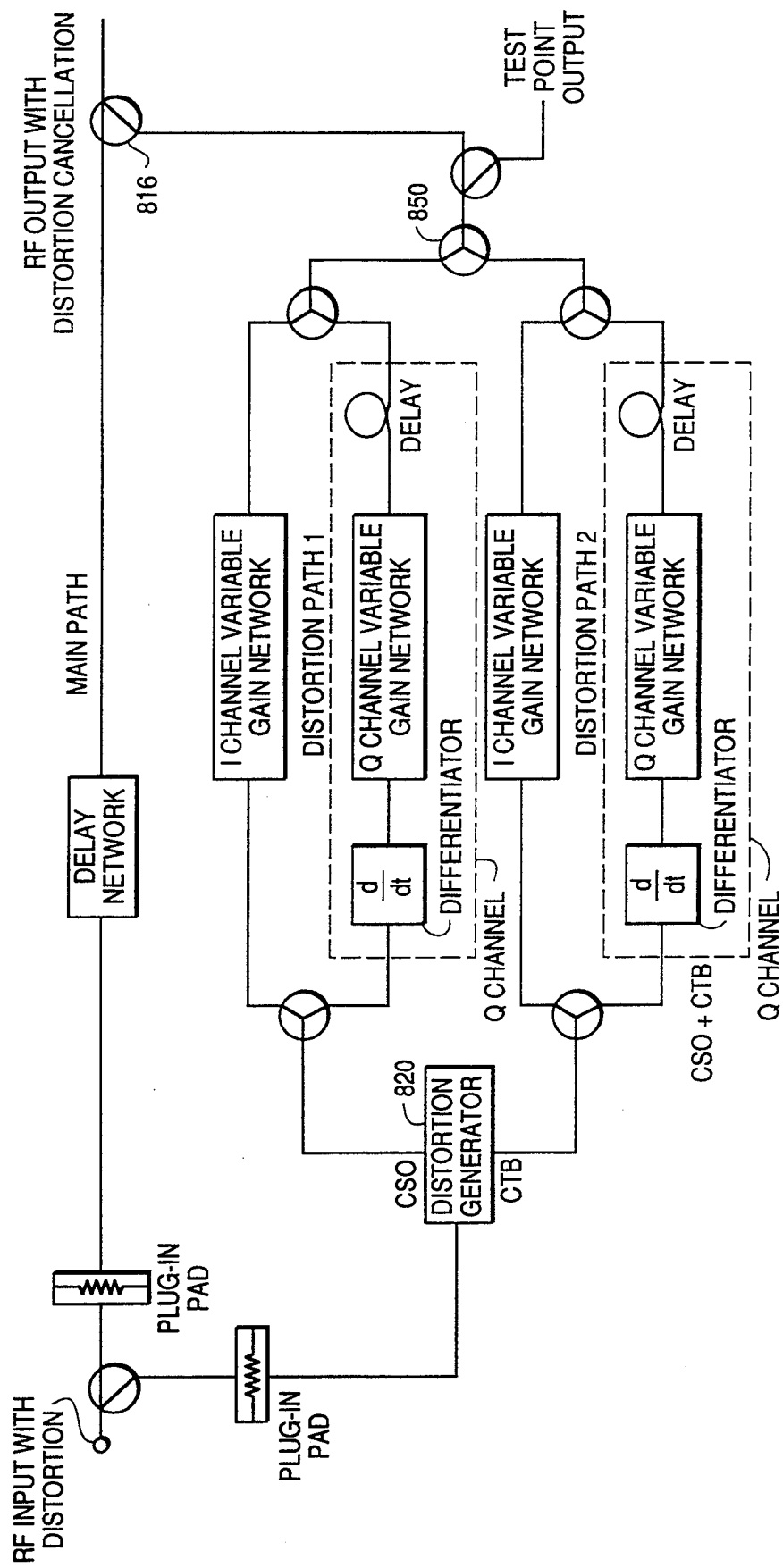
FIG. 4 is a functional block diagram of another type of electrical compensating element for use in the CATV headend of FIG. 1.

Lasers 311 and 3 12 constitute a first laser pair emitting optical signals of different wavelengths which are optically combined or multiplexed by wavelength division multiplexer 321 for transmission over single mode 1310 nm. zero dispersion optical fiber 401. Lasers 313 and 314 constitute a second laser pair emitting optical signals of different wavelengths which are multiplexed by wavelength division multiplexer 322 for transmission over single mode 1310 nm. optical fiber 402. Lasers 315 and 316 constitute a third laser pair emitting optical signals of different wavelengths which are multiplexed by wavelength division multiplexer 323 for transmission over single mode 1310 nm. optical fiber 403. Laser 317 emits optical signals of a first wavelength which is supplied to wavelength division multiplexer 324 for transmission over 1310 nm. optical fiber 404. As will be discussed in detail below, wavelength division multiplexer 324 also receives reverse path optical signal transmissions from one or more remote locations and supplies these reverse path optical signals to photodetector 520. Wavelength division multiplexers 321–324 are preferably of the coupled-fiber type, although the invention is not limited in this respect. It is noted that wavelength division multiplexer 324 may require higher isolation and lower crosstalk values than the other wavelength division multiplexers because of the presence of forward and reverse path optical signals. In a currently preferred implementation, laser 311 outputs optical signals at 1310 nm.; laser 312 outputs optical signals at 1550 nm.; laser 313 outputs optical signals at 1310 nm.; laser 314 outputs optical signals at 1550 nm.; laser 315 outputs optical signals at 1310 nm.; laser 316 outputs optical signals at 1550 nm.; and laser 317 outputs optical signals at 1550 nm. Lasers 311–317 are preferably distributed-feedback type lasers. A 1310 nm. back-up laser (not shown) and a 1550 ran. back-up laser (not shown) may be provided to respectively back up one or more of the 1310 nm. and 1550 nm. lasers as described in commonly assigned U.S. application Ser. No. 07/753,952 entitled "Optical Switching in a Fiber Communications System", filed Sep. 3, 1991. It is noted that while the system of FIG. 4 illustrates two optical signals of different wavelengths multiplexed over a single optical fiber, the invention may be readily applied to systems transmitting more than two optical signals of different wavelengths multiplexed over a single optical fiber.

A preferred number of channels in each of the frequency ranges, the wavelength of the optical signals corresponding to the radio frequency bandwidth, and laser power for the lasers of the system of the second embodiment are set forth in Table 2.

TABLE 2

| Bandwidth | # of Channels | Wavelength | Power |
|---|---|---|---|
| 54–150 | 10–12 | 1310 | 6 or 8 mW |
| 150–222 | 12 | 1310 | 6 or 8 mW |
| 222–276 | 9 | 1310 | 6 or 8 mW |
| 276–330 | 9 | 1550 | 4 or 6 mW |
| 330–402 | 12 | 1550 | 4 or 6 mW |
| 402–474 | 12 | 1550 | 4 or 6 mW |
| 474–552 | 12 | 1550 | 4 or 6 mW |

It is noted that these values are merely illustrative and the invention is not limited in this respect.

In accordance with the embodiment of Table 2, the frequency bands of the radio frequency signals which are combined and supplied to the 1550 nm. lasers each cover less than one octave. That is, the highest signal frequency in the frequency band is less than twice the lowest signal frequency in the frequency band. This arrangement is advantageous since any second order harmonic distortion, particularly such harmonic distortion due to chromatic dispersion, is outside the frequency range of the band and thus may be filtered at the receiver location. It is further noted that the frequency bands of the radio frequency signals which are combined and supplied to the 1310 nm. lasers, except the frequency band from 54–150 MHz, each cover less than one octave. Again, with this arrangement, second order harmonic distortion may be filtered at the receiver location.

Since optical fibers 401–404 are 1310 nm. zero dispersion wavelength optical fibers, the 1550 nm. optical signals will stiffer distortion due to chromatic dispersion. In addition, both the 1310 nm. and 1550 nm. signals are subject to distortion due to, for example, the electro-optic conversion process and/or amplifiers in the optical link.

In order to compensate such distortion, the CATV headend of the second embodiment of the present invention incorporates electrical compensating elements 371–377 for independently compensating the optical signals for harmonic distortion. Electrical compensating elements 371–377 may be circuits for generating a signal which is adjusted in amplitude and phase to cancel the distortion generated in the transmission of the optical signal. Suitable electrical compensating elements for use in the illustrative system of FIG. 7 are discussed above with respect to FIGS. 2–4.

It has been discussed above that the radio frequency bands feeding the 1550 nm. lasers 312, 314, 316, and 317 and the frequency band of the radio frequency signals feeding the 1310 nm. lasers 313 and 3 15 are less than one octave. Thus, the second order harmonic distortion for each of these bands may then be filtered at the receiver. However, such filtering will not serve to remove third order distortion products from these signals. Thus compensating elements 372–377 for compensating the signals need, in general, to only compensate for third order distortion products and a compensating element such as in FIG. 2 or FIG. 3 may be utilized with a distortion generator for generating third order distortion. However, the 54–150 MHz radio frequency band is wider than one octave and thus compensating element 371 preferably compensates the optical signal corresponding to this band for second and third order distortion products. Again, in view of certain manufactured efficiencies, each of the compensating elements 371–377 may be of the type discussed with respect to FIG. 4.

Thus, in accordance with the invention, "predistortion" compensation at the transmitter location is provided to compensate the non-linearities of the laser. If an optical amplifier(s) is present in the optical link, predistortion compensation may be provided to compensate for the non-linearities of the laser and the optical amplifier(s). In a system with a multiplicity of receiving locations, some amount of independent precompensation for chromatic dispersion, particularly for the 1550 nm. signals, may be provided for a common length of optical fiber between the transmitters and receivers. Such precompensation may be accomplished with appropriate adjustments to the electrical compensating circuitry described above or by the inclusion of optical compensating elements 325–328. Optical compensating elements 325–328 are indicated by dotted line boxes to indicate they are optionally included in the system. Optical compensating elements 325–328 may, for example, be optical fibers having dispersion profiles opposite to the dispersion provide experienced by the optical signals output from lasers 372, 374, 376, and 377 when transmitted over standard optical fibers 401–404 to the receiving location.

Thus, an electrical compensating element and/or an optical compensating element in the present system provides the capability of independently "precompensating" an optical signal for harmonic distortion in the fiber communications system due to chromatic dispersion, the electro-optic conversion process, and or amplifies hi the optical link. One advantage of precompensation at the transmitter location is that a single electrical and/or a single optical precompensating element may be utilized, for example, to compensate an optical signal for transmission to a plurality of remote hubs.

Figure 8A:
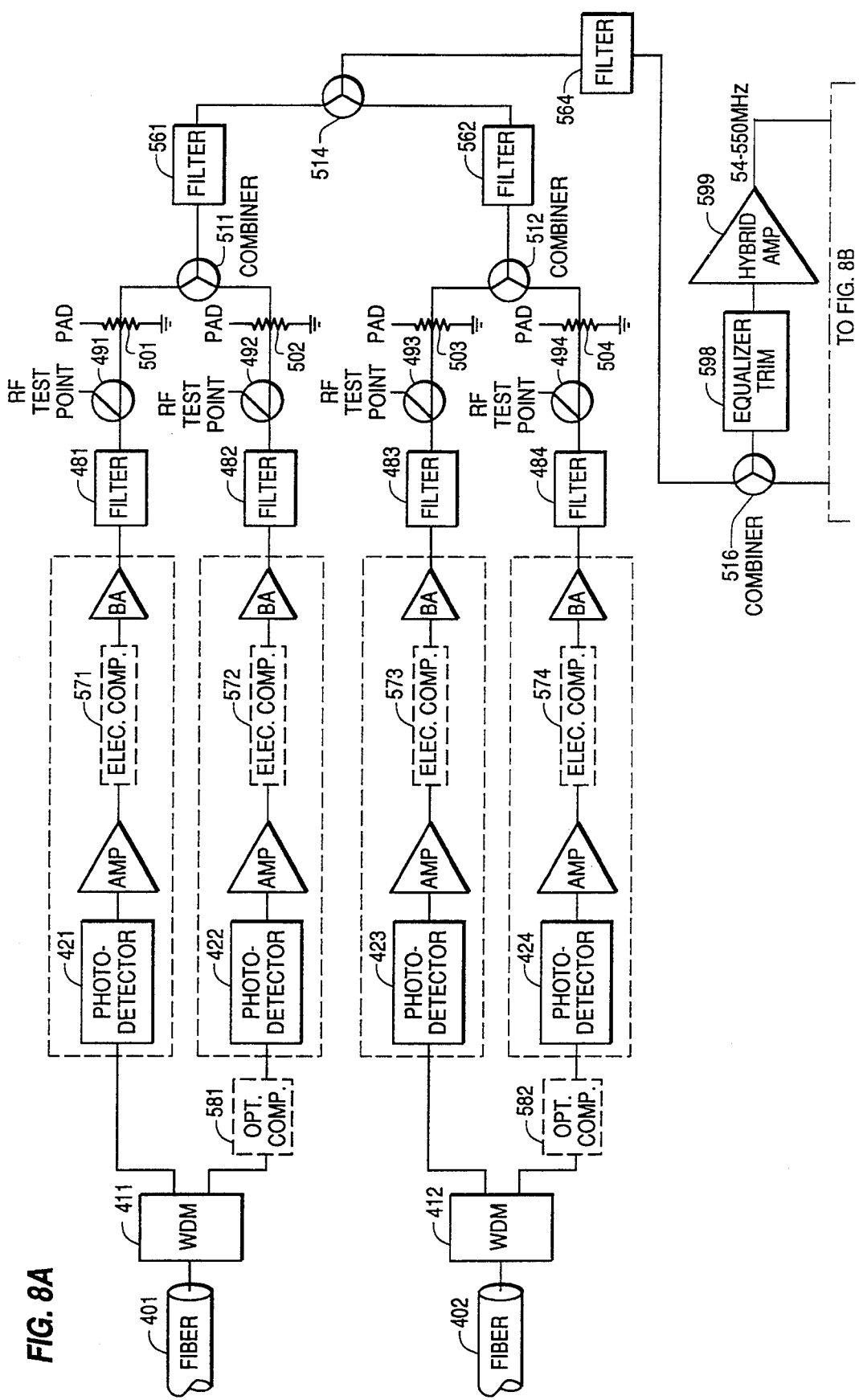
FIG. 8A–8B an illustrative receiver portion of a CATV headend or remote hub configured in accordance with the second embodiment of the present invention.
Figure 8B:
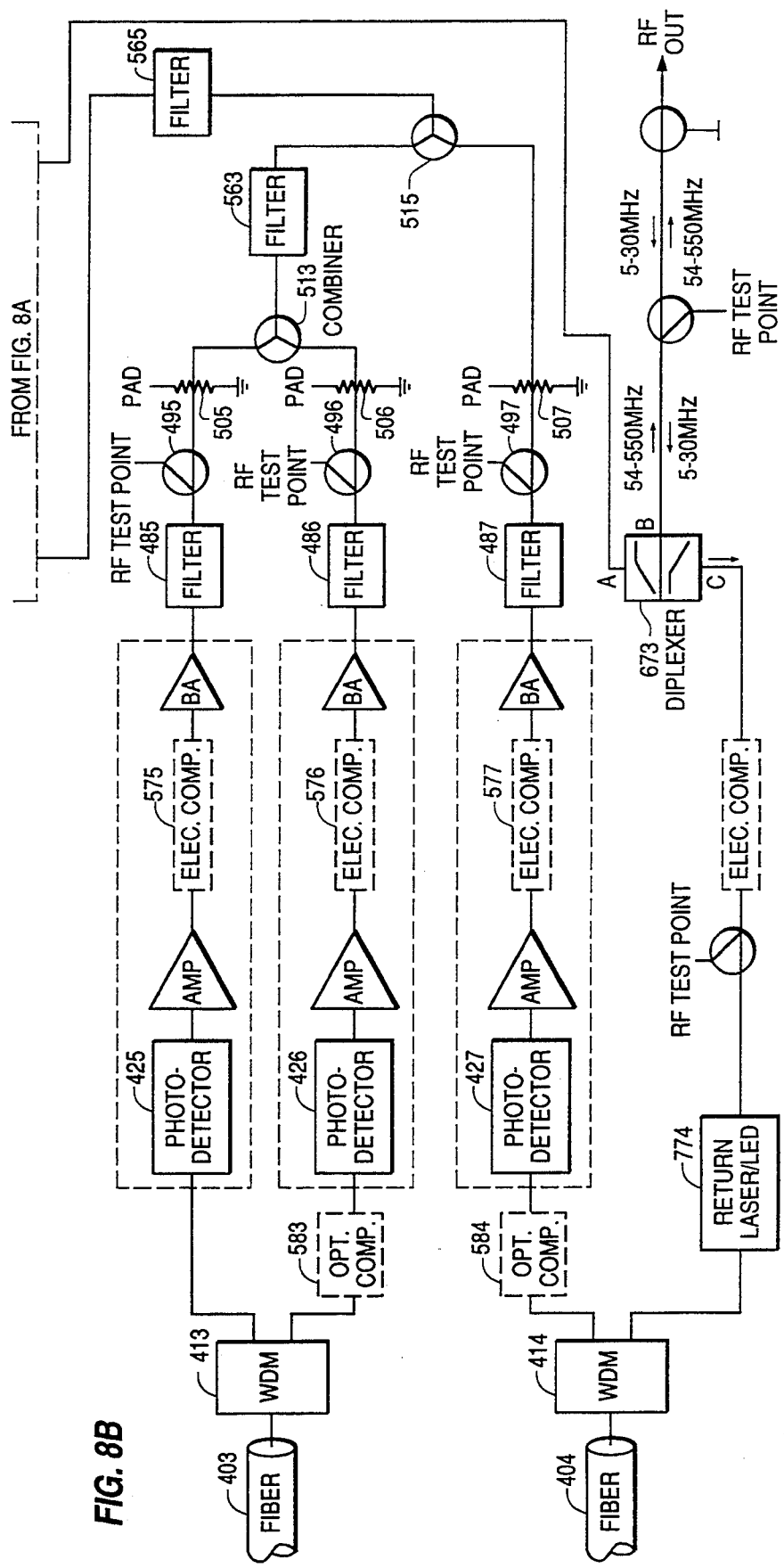

Referring now to FIG. 8, there is shown an illustrative receiver portion of a CATV headend or a remote hub configured in accordance with the second embodiment of the present invention. Optical fibers 401, 402, and 403 deliver the combined or multiplexed 1310 nm. and 1550 nm. optical signals output by the transmitter portion of FIG. 7. Optical fiber 404 delivers the 1550 ran. optical signal output by laser 317. The optical signals from optical fibers 401–404 are respectively supplied to optical decombiners or wavelength division multiplexers 411–414. Wavelength division multiplexer 411 demultiplexes the multiplexed optical signals carried by optical fiber 401 into the 1510 nm. optical signal from laser 312 which is fed to photodetector 422 and the 1310 nm. signal from laser 311 which is fed to photodetector 421. Wavelength division multiplexer 412 demultiplexes the multiplexed optical signals carried by optical fiber 402 into the 1510 nm. optical signal frown laser 314 which is fed to photodetector 424 and the 1310 nm. optical signal from laser 313 which is fed to photodetector 423. Wavelength division multiplexer 413 demultiplexes tile multiplexed signals carried by optical fiber 403 into the 1510 nm. optical signal from laser 316 which is fed to photodetector 426 and the 1310 nm. optical signal from laser 315 which is fed to photodetector 425. Wavelength division multiplexer 414 receives the 1550 nm. optical signal from laser 317 and outputs the signal to photodector 427. Wavelength division multiplexer 414 may require higher isolation and lower crosstalk values than wavelength division multiplexers 411–413 because of the forward and reverse path optical signals.

The demultiplexed and diplexed optical signals are supplied to respective photodetectors. The photodetectors, such as PIN photodiodes, transduce the intensity modulated optical signal supplied to their inputs into amplitude modulated electric current signals. The outputs of photodetectors are amplified by photodetector amplifiers, which may be a push-pull transimpedance amplifier or other suitable type designed for CATV applications. The radio frequency output of the photodetector amplifiers are amplified by buffer amplifiers for output to one of the filters 481–487. Taken together, the photodetector, the photodetector amplifier and, the buffer amplifier constitute an optical receiver. Details of an optical receiver suitable for use in the present system may be found in commonly assigned U.S. application Ser. No. 07/754,029, filed Sep. 3, 1991. In addition, a back-up optical receiver (not shown) for backing up one or more of receivers may be provided as described in commonly assigned U.S. application Ser. No. 07/753,952 entitled "Optical Switching in a Fiber Communications System", filed Sep. 3, 1991. The outputs of the buffer amplifiers are respectively supplied to filters 481–487 which may be multiple pole elliptical bandpass filters. These filters are designed to attenuate frequencies outside of the frequency band of interest on a particular signal path and also act to remove broadband noise from combining between bands. Each of the filters 481–487 is connected to a respective radio frequency test point 491–497. The radio frequency test points are directional couplers for coupling off a portion of the signal output by the corresponding filter. The radio frequency test points are in turn respectively coupled to pads 501–507, which are of conventional design. Pads 501 and 502 are connected to a combiner 511; pads 503 and 504 are connected to a combiner 512; and pads 505 and 506 are connected to a combiner 513. The outputs of combiners 511 and 512 are fed through respective filters 561 and 562 to combiner 514 and the output of combiner 513, via filter 563, and pad 507 are supplied to combiner 515. The outputs of combiners 514 and 515 are supplied through respective filters 564 and 565 to combiner 516. Pads 501–507 are pluggable units which are selected to equalize the amplitude of the signals fed to the combiners. The attenuation required of each pad may be determined by monitoring the outputs of filters 481–487 via radio frequency test points 491–497. The output of combiner 516 is connected to an equalizer trim circuit 598 which in turn feeds a hybrid amplifier 599 such as a Scientific-Atlanta Model 6451 HE/driver amplifier. The output of hybrid amplifier 599 is a broadband radio frequency signal corresponding to the radio frequency inputs supplied to the transmitter portion illustrated in FIG. 4.

Although a currently preferred implementation of the second embodiment utilizes electrical and/or optical compensating elements at the transmitter location only, it is contemplated that electrical and/or optical compensating elements for the independent compensation of optical signals at the receiver location may be provided in addition to, or in place of, compensating elements at the transmitter location. To implement such "post-compensation," electrical compensating elements 571–577 may be arranged between the photodetector amplifiers and the buffer amplifiers. Alternatively, the compensating elements may be arranged after the buffer amplifiers. Electrical compensating element 571–577 may be a circuit for generating signals which are adjusted in amplitude and phase to cancel the distortion generated in the transmission of the optical signal as discussed above with respect to FIG. 6 and commonly assigned copending application Ser. No. 07/958,976 entitled "Postdistortion Circuit For Reducing Distortion In An Optical Communications System", filed Oct. 9, 1992.

Thus, optical signals may be independently "postcompensated" by the provision of electrical compensating elements in the receiver apparatus of FIG. 8. As discussed above, in the preferred embodiment, the radio frequency bands corresponding to the 1550 nm. and all but one of the 1310 nm. optical signals are arranged such that the second order distortion may be filtered by filters 481–487 at the receiver. Thus, electrical compensating elements 572–577 may be utilized to compensate the corresponding signals for third order distortion products. Compensating element 571 may be used to provide compensation for both second order and third order distortion products.

It is noted that since the magnitude of dispersion is dependent on fiber length, postcompensation is particularly advantageous at remote hubs which are linked to a single CATV headend by optical links of different lengths. In such systems, postcompensation permits compensation for specific dispersion profiles and/or electro-optic conversion distortion experienced by optical signals transmitted to the respective remote hubs.

Thus, in accordance with the invention, postdistortion compensation at the receiver location may provided in place of or to supplement the precompensation of the transmitter. To compensate for dispersion, particularly for the 1550 nm. signals, optical compensating elements 581–584 may be provided. Optical compensating elements 581–584 may, for example, be optical fibers having dispersion profiles opposite to the dispersion profile experienced by the 1550 nm. optical signals when transmitted over standard single mode 1310 nm. optical fibers 401–404 to the receiving location. By varying fiber parameters such as material, doping, and the division of light between the core and the cladding, a fiber having a dispersion profile opposite the determined profile is developed.

The system of FIGS. 7 and 8 includes a reverse transmission path from the receiver location to the transmitter location. Typically, in coaxial CATV systems, television signals are transmitted from the headend to receiver locations in a frequency band of 54–550 MHz. In systems having the capability of transmitting signals from the receiver locations back to the headend, the return signals are generally carried in a frequency band ranging from about 5–30 MHz. This band includes a channel T7 (5.75–11.75 MHz), a channel T8 (11.75–17.75 MHz), a channel T9 (17.75–23.75 MHz), and a channel T10 (23.75–29.75 MHz). These return path channels each have television signal bandwidth.

The present invention provides the capability of transmitting return path optical signals over at least one of the fibers. The output of the hybrid amplifier feeds the 54–550 MHz broadband signal into port A of diplexer 673. This signal exits the diplexer at port B thereby passing to the radio frequency output. It will be noted that a return signal in the band of 5–30 MHz enters the node from the radio frequency output, and enters diplexer 673 at its port B. This signal exits the diplexer 673 at port C and is supplied to the return laser 774. This modulated signal is transmitted over the reverse path via optical fiber 404. Laser 774 preferably outputs optical signals having a wavelength of 1310 nm.

The optical signals from laser 774 carried by optical fiber 404 are fed to wavelength division multiplexer 324 at the CATV headend location illustrated in FIG. 7. Wavelength division multiplexer 324 provides the signals to photodetector 520 which converts the received optical signals to radio frequency signals in the original 5–30 MHz band.

Electrical compensation for the reverse transmissions may be provided to compensate for harmonic distortions due to the electro-optic conversion at the laser, the receiver, and/or at any amplifiers in the optical link. If desired, compensating elements may be provided at either the transmitter location or the receiver location or both for compensating the 1310 nm. optical signals for harmonic distortion due to the electro-optic conversion process at the laser, the receiver, and/or at any amplifiers in the optical link.

The system of the second embodiment retains the advantages of the first embodiment and additionally provides the capability of reverse transmission of optical signals. Exemplary, but illustrative, specifications of a system in accordance with the second embodiment of the present invention are:

|  | Estimated Loss Budget (dB) | | CNR |
|---|---|---|---|
|  | 1310 nm. | 1550 nm. | 550 MHz |
| Distance (km) | | | |
| 20 | 9 | 7 | 56.5 |
| 30 | 12.75 | 9.75 | 56 |
| 40 | 16.5 | 12.50 | 53 |
| 50 | 20.25 | 15.25 | 49.5 |
| Distortions | | | |
| CTB | | | 70 |
| CSO | | | 70 |

While there has been shown and described the preferred embodiments of the invention, it will be evident to those skilled in the art that various modifications may be made thereto without departing from the spirit and scope of the invention which is set forth in the appended claims.

I claim:

1. A transmitter node for transmitting optical signals over an optical fiber having a zero dispersion wavelength, comprising:
    electrical signals carrying information;
    light emitting devices each outputting an optical signal of a different wavelength which is modulated by a corresponding one of said electrical signals;
    a wavelength division multiplexer for multiplexing the optical signals output by said light emitting devices onto said optical fiber; and
    electrical dispersion compensating means for independently compensating one or more electrical signals which modulate optical signals having wavelengths different than said zero dispersion wavelength for dispersion in said optical fiber.

2. The transmitter node according to claim 1, wherein said electrical signals are radio frequency signals.

3. The transmitter node according to claim 2, wherein each radio frequency signal which modulates an optical signal having a wavelength different than the zero dispersion wavelength is less than one octave of frequency.

4. The transmitter node according to claim 1, wherein said optical fiber includes a single mode fiber.

5. The transmitter node according to claim 1, wherein said single mode fiber is a dispersion shifted single mode fiber.

6. The transmitter node according to claim 1, wherein a first light emitting device outputs an optical signal having a wavelength of 1330 nanometers and a second light emitting device outputs an optical signal having a wavelength of 1550 nanometers.

7. The transmitter node according to claim 1, further comprising:
    optical dispersion compensating means for independently compensating one or more optical signals output by said light emitting devices which have wavelengths different than said zero dispersion wavelength for dispersion in said optical fiber.

8. The transmitter node according to claim 1, wherein said light emitting devices each output an optical signal of a different wavelength whose intensity is amplitude modulated by the corresponding one of said electrical signals.

9. A receiver node for receiving multiplexed optical signals over an optical fiber having a zero dispersion wavelength, comprising:
    a wavelength division demultiplexer for demultiplexing the multiplexed optical signals from said optical fiber into a plurality of optical signals having different wavelengths;
    detectors each transducing one of said plurality of optical signals into a corresponding electrical signal; and
    electrical dispersion compensating means for independently compensating one or more electrical signals which are transferred from optical signals having wavelengths different than said zero dispersion wavelength for dispersion in said optical fiber.

10. The receiver node according to claim 9, wherein said detectors each transduce one of said plurality of optical signals into radio frequency electrical signals.

11. The receiver node according to claim 9, wherein said optical fiber comprises a single mode fiber.

12. The receiver node according to claim 11, wherein said single mode fiber is a dispersion shifted single mode fiber.

13. The receiver node according to claim 9, wherein a first of said plurality of optical signals has a wavelength of 1330 nanometers and a second of said plurality of optical signals has a wavelength of 1550 nanometers.

14. The receiver node according to claim 9, further comprising:
    optical dispersion compensating means for independently compensating one or more optical signals transduced by said detectors which have wavelengths different than said zero dispersion wavelength for dispersion in said optical fiber.

15. The receiver node according to claim 9, wherein said plurality of optical signals are amplitude modulated optical signals.

16. An optical communications system, comprising:
    an optical fiber having a zero dispersion wavelength;
    a transmitter node including:
        electrical signals carrying information;
        light emitting devices each outputting a transmit optical signal of a different wavelength which is modulated by a corresponding one of said electrical signals; and
        a wavelength division multiplexer for multiplexing the transmit optical signals output by said light emitting devices onto said optical fiber;
    a receiver node including:
        a wavelength division demultiplexer for demultiplexing the multiplexed optical signals on said optical fiber into a plurality of receive optical signals having different wavelengths; and
        detectors each transducing one of said plurality of receive optical signals into a corresponding electrical signal; and
    electrical dispersion compensating means including at least one of first electrical dispersion compensating means located at said transmitter node for independently compensating one or more electrical signals which modulate optical signals having wavelengths different than said zero dispersion wavelength for dispersion in said optical fiber and second electrical dispersion compensation means located at said receiver node for independently compensating one or more electrical signals which are transduced from optical having wavelengths different than said dispersion wavelength for dispersion in said optical fiber.

17. The optical communications system according to claim 16, wherein said electrical dispersion compensating means is only at said transmitter node.

18. The optical communications system according to claim 16, wherein said electrical dispersion compensating means is only at said receiver node.

19. The optical communications system according to claim 16, wherein electrical dispersion compensating means is at both said transmitter node and said receiver node.

20. The optical communications system according to claim 16, wherein at least one of said transmitter node and said receiver node further includes optical dispersion compensating means for independently compensating one or more optical signals which have wavelengths different than said zero dispersion wavelength for dispersion in said optical fiber.

21. The optical communications system according to claim 16, wherein said light emitting devices each output a transmit optical signal of a different wavelength whose intensity is amplitude modulated by the corresponding one of said electrical signals.

22. An optical node for use in an optical communications system including an optical fiber having a zero dispersion wavelength, said optical node comprising:

a first electrical signal carrying information;

a light emitting device outputting a transmit optical signal having a first wavelength which is modulated by said electrical signal;

a detector for transducing a receive optical signal having a second wavelength into a second electrical signal, said receive signal being received from another optical node;

a wavelength division multiplexer for multiplexing optical signals between said optical fiber and said light emitting device and between said optical fiber and said detector; and electrical dispersion compensating means including at least one of first electrical dispersion compensating means for compensating one or more electrical signals which modulate optical signals having wavelengths different than said zero dispersion wavelength for dispersion in said optical fiber and second electrical dispersion compensating means for compensating one or more electrical signals which are transduced from optical wavelengths having wavelengths different than said zero dispersion wavelength for dispersion in said optical fiber.

23. The optical communications node according to claim 22, further comprising:

at least one optical dispersion compensating element for compensating optical signals which have wavelengths different than said zero dispersion wavelength for dispersion in said optical fiber.

24. The optical communications node according to claim 22, wherein said light emitting device outputs a transmit optical signal having a first wavelength whose intensity is amplitude modulated by said electrical signal.

* * * * *